US006889316B2

(12) United States Patent
Inoue et al.

(10) Patent No.: US 6,889,316 B2
(45) Date of Patent: May 3, 2005

(54) METHOD AND APPARATUS FOR RESTORING REGISTERS AFTER CANCELLING A MULTI-CYCLE INSTRUCTION

(75) Inventors: Ryo Inoue, Austin, TX (US); Gregory A. Overkamp, Austin, TX (US)

(73) Assignees: Intel Corporation, Santa Clara, CA (US); Analog Devices, Norwood, MA (US)

( * ) Notice: Subject to any disclaimer, the term of this patent is extended or adjusted under 35 U.S.C. 154(b) by 622 days.

(21) Appl. No.: 09/820,570

(22) Filed: Mar. 28, 2001

(65) Prior Publication Data

US 2002/0144093 A1 Oct. 3, 2002

(51) Int. Cl.⁷ ................................................. G06F 9/38
(52) U.S. Cl. ....................................... 712/218; 712/219
(58) Field of Search ................................ 712/218, 219, 712/244, 216, 215, 24, 234, 23

(56) References Cited

U.S. PATENT DOCUMENTS

| | | | |
|---|---|---|---|
| 5,644,742 A | * | 7/1997 | Shen et al. .................. 712/244 |
| 5,706,459 A | * | 1/1998 | Atsushi ....................... 712/200 |
| 6,263,416 B1 | * | 7/2001 | Cherabuddi .................. 712/23 |
| 6,425,072 B1 | * | 7/2002 | Meier et al. ................. 712/218 |
| 6,442,678 B1 | * | 8/2002 | Arora ......................... 712/218 |

* cited by examiner

Primary Examiner—Henry W. H. Tsai
(74) Attorney, Agent, or Firm—Fish & Richardson P.C.

(57) ABSTRACT

In an embodiment, a pipelined processor may be adapted to process multi-cycle instructions (MCIs). Results generated in response to non-terminal sub-instructions may be written to a speculative commit register. When the MCI commits, i.e., a terminal sub-instruction reaches the WB stage, the value in the speculative commit register may be written to the architectural register.

24 Claims, 5 Drawing Sheets

US 6,889,316 B2

METHOD AND APPARATUS FOR RESTORING REGISTERS AFTER CANCELLING A MULTI-CYCLE INSTRUCTION

BACKGROUND

A programmable processor, such as a microprocessor for a computer or a digital signal processing system, may support one or more "multi-cycle" machine instructions in which a single machine instruction directs the processor to perform multiple operations. An exemplary multi-cycle instruction is a "Load Multiple" instruction in which the processor performs a series of load operations in response to a single machine instruction. Another example is a "Push-Pop Multiple" instruction that directs the processor to push or pop multiple registers to or from a stack. Because multi-cycle instructions pack multiple operations into a single machine instruction, they may increase code density and improve the operational efficiency of the programmable processor.

DESCRIPTION

Figure 1:
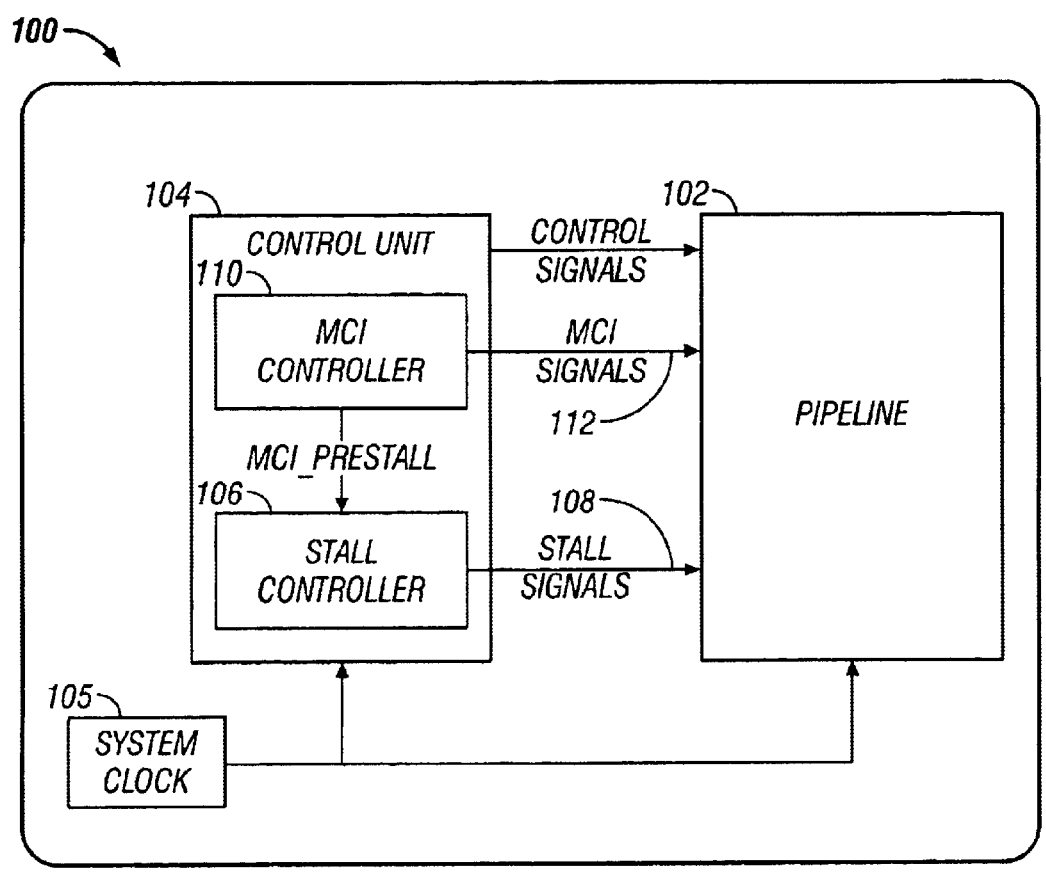
FIG. 1 is a block diagram illustrating a pipelined programmable processor according to an embodiment.

FIG. 1 is a block diagram illustrating a programmable processor 100, which supports one or more multi-cycle instructions (MCIs). The processor 100 may include an execution pipeline 102 and a control unit 104. The control unit 104 may control the flow of instructions and data through the pipeline 102 in accordance with a system clock 105. During the processing of an instruction, the control unit 104 may direct the various components of the pipeline to decode the instruction and to perform the corresponding operation including, for example, writing results back to memory.

Instructions may be loaded into a first stage of the pipeline 102 and be processed through subsequent stages. A stage may process concurrently with the other stages. Data may be passed between the stages in the pipeline 102 in accordance with the system clock signal. Instruction results may emerge at the end of the pipeline 102 in succession.

In response to an MCI, a stall controller 106 may stall one or more stages of the pipeline 102 by asserting stall signals 108 in order to prevent the pipeline 102 from fetching and decoding additional instructions while the MCI is executing. After stalling a portion of the pipeline 102, an MCI controller 110 may assert MCI signals 112 and direct the pipeline 102 to perform additional operations defined by the current MCI.

Figure 2:
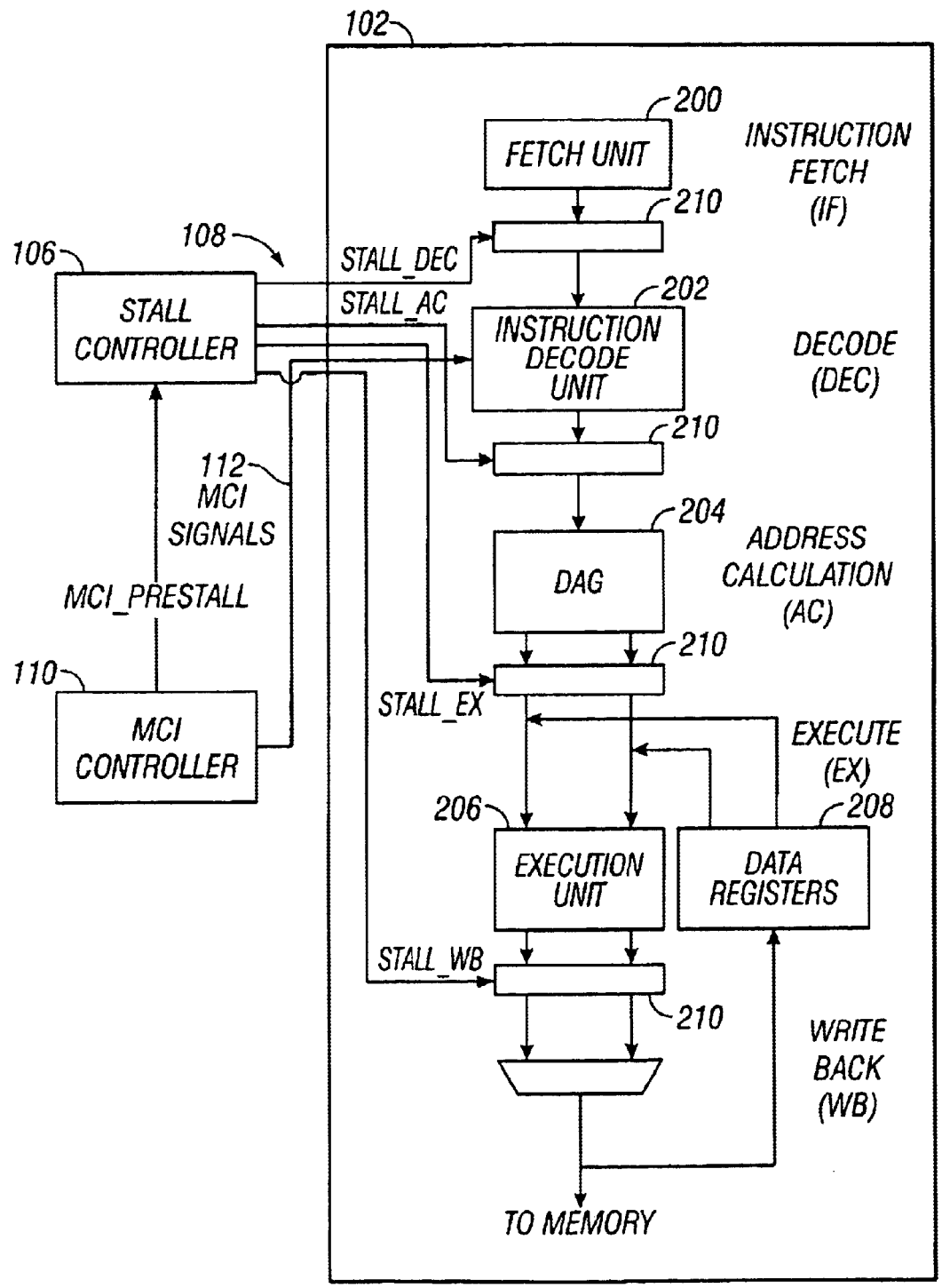
FIG. 2 is a schematic illustrating an exemplary execution pipeline.

FIG. 2 illustrates an exemplary pipeline 102. The pipeline 102 may include, for example, five stages: instruction fetch (IF), instruction decode (DEC), address calculation (AC), execute (EX), and write back (WB). According to alternate embodiments, these stages may include sub-stages, e.g., the EX stage may include multiple sub-stages EX1, EX2, etc.

Instructions may be fetched from a memory device such as, for example, a main memory or an instruction cache, during the IF stage by a fetch unit 200 in a clock cycle. An instruction fetched in a clock cycle may be decoded in a subsequent clock cycle in the DEC stage by an instruction decode unit 202. The results may be passed to the AC stage, where a data address generator (DAG) 204 may calculate memory addresses for performing the operation. During the EX stage, an execution unit 206 may perform a specified operation such as, for example, adding or multiplying two numbers. The execution unit 206 may contain specialized hardware for performing the operations including, for example, one or more arithmetic logic units (ALUs), multiply and accumulate (MAC) units, and barrel shifters. A variety of data may be applied to the execution unit 206 such as the addresses generated by the DAGs 204, data retrieved from memory or data retrieved from data registers 208. During the WB stage, the results may be written back to data memory or to data registers 208.

During execution of an MCI, multiple instructions may be issued from the DEC stage of the pipeline 102 over several clock cycles. The MCI remains stalled in the decode stage of the pipeline 102 while multiple "sub-instructions" may be sent down the pipeline 102 under control of the MCI controller 110. The MCI controller 110 may operate according to a number of internal state machines in order to direct the instruction decode unit 202 to dispatch a number of operations over a number of clock cycles during the execution of the MCI.

The stall controller 106 may stall one or more stages of the pipeline 102 by asserting stall signals 108 in order to prevent the pipeline 102 from fetching and decoding additional instructions while the MCI is executing. The stages of the pipeline 102 may include storage units, such as stage registers 210, for storing the results of the current stage. The stage registers 210 may latch the results according to the system clock. The stall signals 108 received by the stage registers 210 control whether or not the stage registers 210 latch the results from the previous stage. In this manner, the stall controller 106 may stall one or more stages of the pipeline 102 in response to an MCI.

An MCI may include a terminal sub-instruction, i.e., the last sub-instruction, and one or more non-terminal sub-instructions, which include the first and any intervening sub-instructions. When a sub-instruction reaches the WB stage, that sub-instruction is considered to be committed. When the terminal sub-instruction reaches the WB stage, the MCI is considered to be committed.

An instruction may be cancelled (i.e., "killed"), and all writes turned off for that instruction, if it is no longer valid for the current program flow. This may occur, for example, when an interrupt is taken. When an interrupt occurs, all instructions in the pipeline may be cancelled, e.g., by placing zeroes into the pipeline latches of the cancelled instructions, and instructions from an interrupt service routine (ISR) may be fetched and introduced into the pipeline.

After the interrupt has been handled by the ISR, the program counter (PC), which tracks the program flow, may return to a cancelled instruction to resume the program flow. In other words, the pipeline backs up to the state it had prior to executing the cancelled instruction.

When the PC returns from the ISR, it may be desirable for the architectural registers to have the values they had before the cancelled instruction was introduced into the pipeline. The architectural registers may include, for example, pointer registers (PREG) for storing pointer values.

When an MCI is cancelled in the pipeline, a non-terminal sub-instruction may have already reached the WB stage, and in doing so, may have written a result to an architectural register. The previous value held by that architectural register may be lost, making it difficult for the processor 100 to return to the state it had prior to executing the cancelled MCI.

Figure 3:
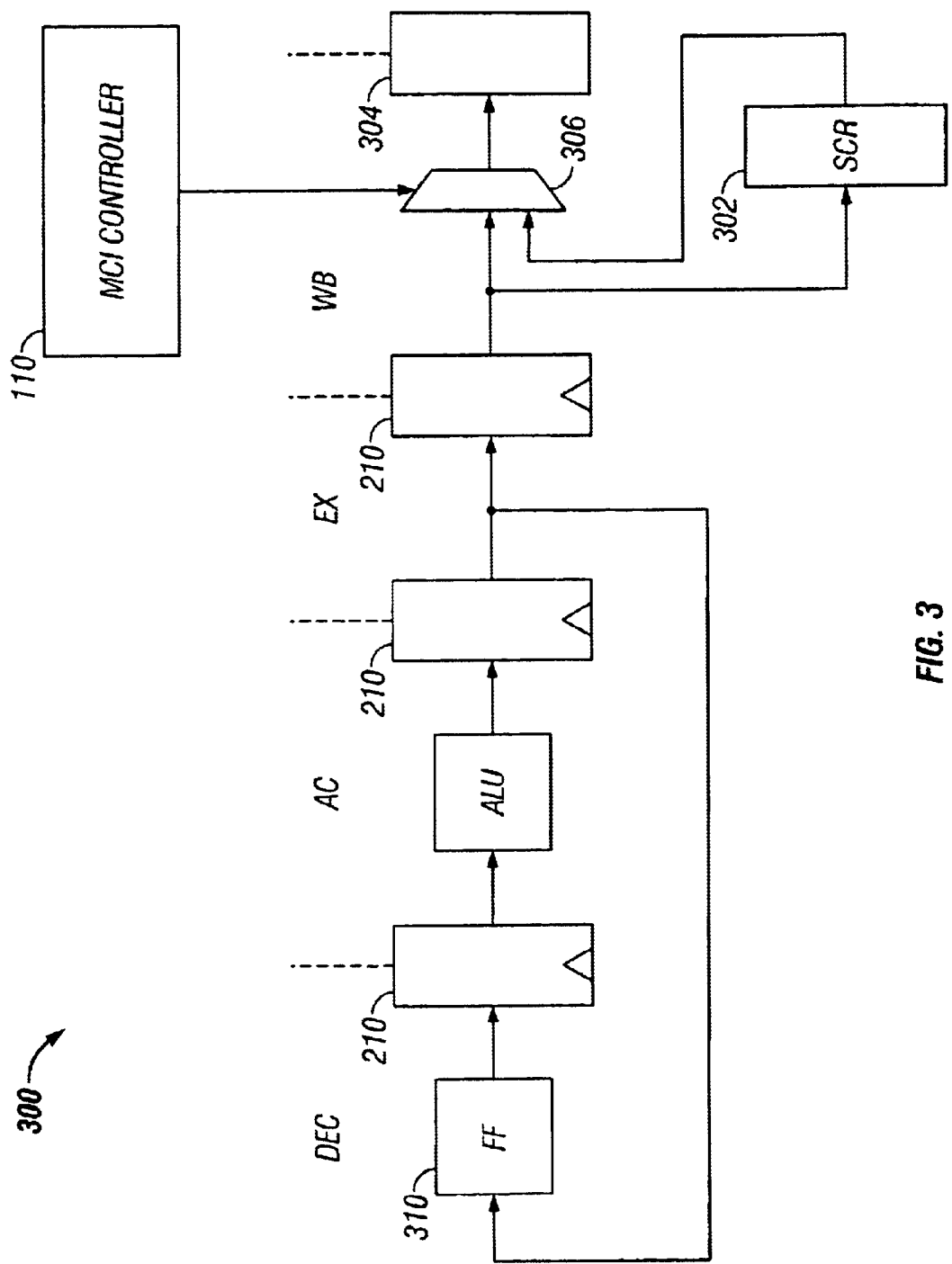
FIG. 3 is a schematic illustration of a portion of a pipeline, which includes a speculative commit register according to an embodiment.

In an embodiment, results generated during the execution of non-terminal sub-instructions of an MCI in the pipeline 102 may not be written to the architectural registers until the MCI commits, which occurs when the terminal sub-instruction reaches the WB stage. FIG. 3 illustrates an exemplary pipeline 300 that includes a speculative commit register (SCR) 302 to store a value produced by a non-terminal sub-instruction until the clock cycle in which the MCI commits. When a non-terminal instruction reaches the WB stage, any results may be written to the SCR 302 rather than an architectural register 304. When the terminal sub-instruction reaches the WB stage, the MCI controller 110 may control a multiplexer (MUX) 306 to write the value stored in the SCR 302 to the architectural register 304. In this manner, architectural registers are not written until the MCI commits. Thus, if the MCI is cancelled in the pipeline 300 prior to committing, the pipeline may be restored to the state it had prior to the MCI being executed.

Figure 4:
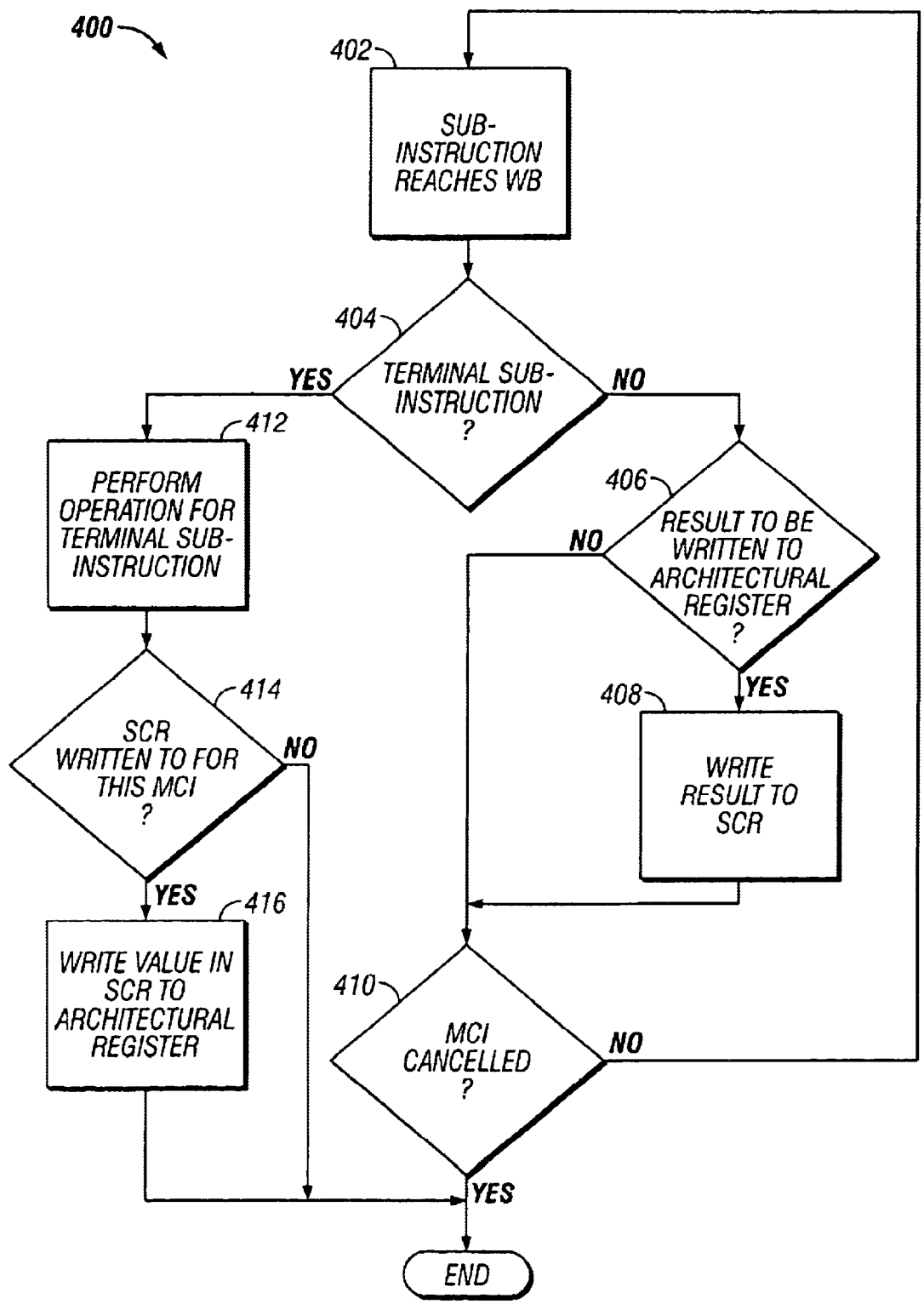
FIG. 4 is a flowchart describing a speculative commit operation according to an embodiment.

FIG. 4 is a flowchart illustrating a speculative commit operation 400 according to an embodiment. The flow of the operation described in FIG. 4 is exemplary, and blocks in the flowchart may be skipped or performed in different order according to alternate embodiments.

When a sub-instruction reaches the WB stage in block 402, the processor 100 determines whether or not the sub-instruction is the terminal sub-instruction in block 404. For a non-terminal sub-instruction, it is determined whether the result is designated for an architectural register in block 406. If so, the result is written to the SCR 302. If it is determined that the MCI is cancelled in the next cycle in block 410, the operation 400 ends with the architectural register unaltered by the cancelled MCI. If the MCI is not cancelled, the operation 400 returns to block 402.

When the terminal sub-instruction for the MCI reaches the WB stage, the operation corresponding to that sub-instruction is performed in block 412, which may include writing to an architectural register. If it is determined that a result from a non-terminal sub-instruction of the MCI was written to the SCR 302, the MCI controller 110 controls the MUX 306 to write that result to the corresponding architectural register 304. Otherwise, the operation 400 ends.

A "Link" instruction is an example of an MCI that may alter an architectural register before committing. The Link instruction may be used to invoke a subroutine. When a subroutine is called, the processor 100 may store a return address for the subroutine on a stack, and set aside space on the stack (a frame) to store dynamic local data for the subroutine during its execution.

The stack pointer points to the top of a stack, and changes often during the execution of a program. The size of the stack is increased on each subroutine call by decrementing the stack pointer, which grows downwards. Later, on subroutine return, the size of the stack may be decreased by incrementing the stack pointer appropriately.

When the subroutine is called, the frame pointer may be set to the value the stack pointer had when the current subroutine was called, before it was decremented for the subroutine. Because the stack pointer may change during execution, the data stored on the stack for the current subroutine are typically de-referenced by the frame pointer, since the frame pointer stays constant during the execution of routine.

An exemplary Link instruction includes the following four sub-instructions:

1 PUSH RETS
2 PUSH FP
3 FP=SP
4 SP=SP+IMM

These sub-instructions may result in the processor 100 (1) pushing a return address for a subroutine (RETS) on a stack, (2) pushing a frame pointer (FP) on the stack, (3) moving the stack pointer (SP) to the frame pointer, and updating the stack pointer based on a frame size (IMM for immediate value) for the subroutine as specified by the instruction. Typically, when sub-instruction (3), FP=SP, reaches the WB stage, the stack pointer value is written to an architectural register reserved for the frame pointer, FPREG. Since this occurs before the MCI commits, the previous value in FPREG would be lost if the Link instruction was cancelled before terminal sub-instruction (4) reached the WB stage.

According to an embodiment, this problem may be avoided by storing the stack pointer value in the SCR 302 until the Link instruction commits. Referring now to FIG. 4, when instruction (3) reaches the WB stage in block 402, it is determined to be a non-terminal sub-instruction in block 404. Since the result is designated for the FPREG, the result, SP, is written to the SCR 302 rather than FPREG. When terminal sub-instruction (4) reaches the WB stage in block 402, the stack pointer is updated and written to an architectural register reserved for the stack pointer, SPREG, in block 412, and the stack pointer value in the SCR 302 is written to FPREG in block 416.

An "Unlink" instruction is another example of an MCI that may alter an architectural register before committing. The Unlink instruction may be used to exit a subroutine. An exemplary Unlink instruction includes the following three sub-instructions.

1 RETS=[FP+4]
2 SP=FP+8
3 FP=[FP]

These sub-instructions may result in the processor 100 (1) restoring the return address from the stack, (2) restoring the stack pointer, and (3) restoring the frame pointer with a value read from memory. Typically, the architectural register SPREG would be written to when sub-instruction (2), SP=FP+8, reached the WB stage. Since this occurs before the MCI commits, the previous value in SPREG would be lost if the Unlink instruction was cancelled before terminal sub-instruction (3) reached the WB stage.

According to an embodiment, this problem may be reduced by storing the updated stack pointer value in the SCR 302 until the Unlink instruction commits. As shown in FIG. 4, when instruction (2) reaches the WB stage in block 402, it is determined to be a non-terminal sub-instruction in block 404. Since the result is designated for the SPREG, the result of FP+8 is written to an SCR rather than SPREG. When terminal sub-instruction (3) reaches the WB stage in block 402, the frame pointer is restored in block 412, and the value in the SCR 302 is written to SPREG in block 416.

A "PushPopMultiple" instruction is another example of an MCI that may alter an architectural register (SPREG) before committing. The PushPopMultiple instruction may be used to perform a number of pushes or pops from the stack in sequence. As each sub-instruction exits the AC stage, the SP value is incremented, or decremented, by a value of one. An SP value calculated in the AC stage in response to a sub-instruction may be forwarded to a working register, or future file (FF) 310, in the DEC stage. This new SP value may be used as the base SP value for the address calculation operation performed in response to the next issued sub-instruction. The changing SP values may be stored in the SCR 302 until the terminal sub-instruction reaches the WB stage, at which point the final SP value may be written to the architectural register, SPREG.

The processor 100 may be implemented in a variety of systems including general purpose computing systems, digital processing systems, laptop computers, personal digital assistants (PDAs) and cellular phones. In such a system, the processor may be coupled to a memory device, such as a Flash memory device or a static random access memory (SRAM), which stores an operating system or other software applications.

Such a processor 100 may be used in video camcorders, teleconferencing, PC video cards, and High-Definition Television (HDTV). In addition, the processor 100 may be used in connection with other technologies utilizing digital signal processing such as voice processing used in mobile telephony, speech recognition, and other applications.

Figure 5:
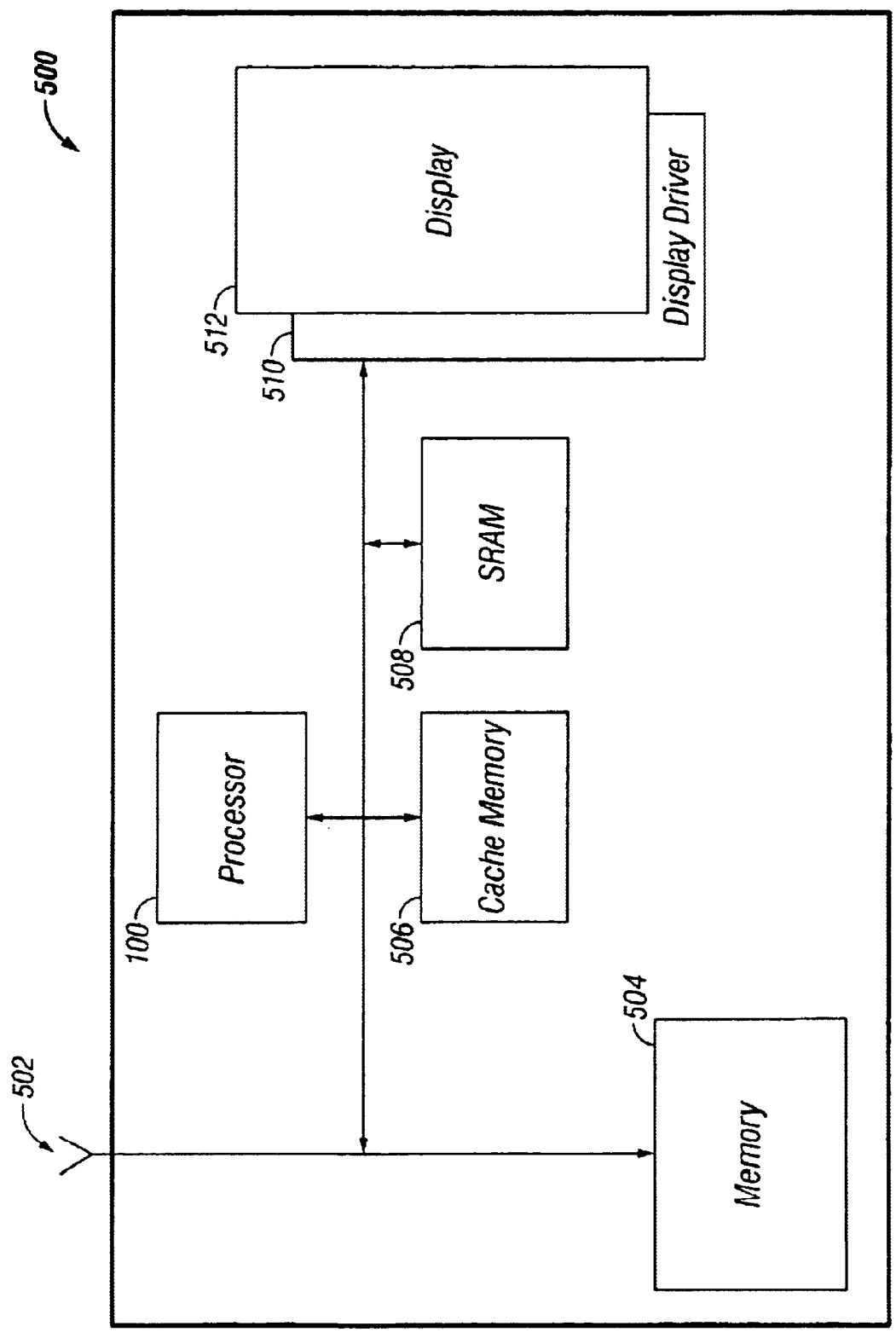
FIG. 5 is a block diagram of a mobile video unit including a processor according to an embodiment.

For example, FIG. 5 illustrates a mobile video device 500 including a processor 100 according to an embodiment. The mobile video device 500 may be a hand-held device which displays video images produced from an encoded video signal received from an antenna 502 or a digital video storage medium 504, e.g., a digital video disc (DVD) or a memory card. The processor 100 may communicate with a cache memory 506, which may store instructions and data for the processor operations, and other devices, for example, an SRAM 508.

The processor 100 may be a microprocessor, a digital signal processor (DSP), a microprocessor controlling a slave DSP, or a processor with a hybrid microprocessor/DSP architecture. The processor 100 may perform various operations on the encoded video signal, including, for example, analog-to-digital conversion, demodulation, filtering, data recovery, and decoding. The processor 100 may decode the compressed digital video signal according to one of various digital video compression standards such as the MPEG-family of standards and the H.263 standard. The decoded video signal may then be input to a display driver 510 to produce the video image on a display 512.

A number of embodiments of the invention have been described. Nevertheless, it will be understood that various modifications may be made without departing from the spirit and scope of the invention. For example, other SCRs may be provided in the pipeline for different MCIs and different architectural registers. Accordingly, other embodiments are within the scope of the following claims.

What is claimed is:

1. A method comprising:
   introducing a multi-cycle instruction including two or more sub-instructions into multiple stages of a pipeline;
   writing a result generated in response to a sub-instruction in a speculative commit register; and
   writing a value in the speculative commit register to an architectural register in response to the multi-cycle instruction committing, wherein the committing occurs when a last sub-instruction of the multi-cycle instruction reaches a write back stage of the pipeline.

2. The method of claim 1, wherein writing the value to the architectural register comprises writing the value to a pointer register.

3. The method of claim 1, wherein introducing the multi-cycle instruction into the pipeline comprises introducing a non-terminal sub-instruction and a terminal sub-instruction into the pipeline.

4. The method of claim 3, wherein writing the value in response to the multi-cycle instruction committing comprises writing the value, in response to the terminal sub-instruction committing.

5. The method of claim 1, wherein writing the result comprises writing a frame pointer value.

6. The method of claim 1, wherein writing the result comprises writing a stack pointer value.

7. An article comprising a machine-readable medium which stores machine-executable instructions, the instructions causing a machine to:
   introduce a multi-cycle instruction including two or more sub-instructions into multiple stages of pipeline;
   write a result generated in response to a sub-instruction in a speculative commit register; and
   write a value in the speculative commit register to an architectural register in response to the multi-cycle instruction committing, wherein the committing occurs when a last sub-instruction of the multi-cycle instruction reaches a write back stage of the pipeline.

8. The article of claim 7, wherein the architectural register comprises a pointer register.

9. The article of claim 7, wherein the multi-cycle instruction comprises a non-terminal sub-instruction and a terminal sub-instruction.

10. The article of claim 9, wherein the multi-cycle instruction commits when the terminal sub-instruction commits.

11. The article of claim 7, wherein the architectural register comprises a frame pointer register.

12. The article of claim 7, wherein the architectural register comprises a stack pointer register.

13. A processor comprising:
   a pipeline operative to execute a multi-cycle instruction including a terminal sub-instruction and a non-terminal sub-instruction;
   an architectural register;
   a speculative commit register operative to store results generated in response to the sub-instructions; and
   a controller operative to control writing a result from the speculative commit register to the architectural register in response to the terminal sub-instruction committing, wherein the committing occurs when the terminal sub-instruction of the multi-cycle instruction reaches a write back stage of the pipeline.

14. The processor of claim 13, further comprising a switching element comprising:
   a first input data line coupled to the pipeline;
   a second input data line coupled to the speculative commit register; and
   an output data line coupled to the architectural register, said switching element being operative to switch between the first input data line and the second input data line in response to control signals from the controller.

15. The processor of claim 13, wherein the switching element comprises a multiplexer.

16. The processor of claim 13, wherein the architectural register comprises a pointer register.

17. The processor of claim 13, wherein the architectural register comprises a stack pointer register.

18. The processor of claim 13, wherein the architectural register comprises a frame pointer register.

19. The processor of claim 13, wherein the multi-cycle instruction comprises an instruction operative to invoke a subroutine.

20. The processor of claim 13, wherein the multi-cycle instruction comprises an instruction operative to exit a subroutine.

21. The processor of claim 13, wherein the multi-cycle instruction comprises an instruction operative to push or pop two or more values from a stack in sequence.

22. A system comprising:
   a static random address memory; and
   a processor coupled to the static random access memory, said processor comprising:
      a pipeline operative to execute a multi-cycle instruction including a terminal sub-instruction and a non-terminal sub-instruction;
      an architectural register;
      a speculative commit register operative to store results generated in response to the sub-instructions; and
      a controller operative to control writing a result from the speculative commit register to the architectural register in response to the terminal sub-instruction committing, wherein the committing occurs when the terminal sub-instruction of the multi-cycle instruction reaches a write back stage of the pipeline.

23. The system of claim 22, wherein the architectural register comprises a frame pointer register.

24. The system of claim 22, wherein the architectural register comprises a stack pointer register.

* * * * *